(12) United States Patent
Staser et al.

(10) Patent No.: US 12,070,990 B2
(45) Date of Patent: Aug. 27, 2024

(54) AUTOMOTIVE TRIM PIECE WITH INTUITIVE SMART SWITCHES LOCATED UNDER THE AUTOMOTIVE SOFT TRIM SKIN

(71) Applicant: Inteva Products, LLC, Troy, MI (US)

(72) Inventors: Brian H. Staser, Oxford, MI (US); Tyler R. Bame, Clawson, MI (US); Aidano Nascimento, Oakland, MI (US); Michael Kobylinski, Roseville, MI (US); David Whitehead, Rochester Hills, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 386 days.

(21) Appl. No.: 17/503,935

(22) Filed: Oct. 18, 2021

(65) Prior Publication Data

US 2022/0118831 A1 Apr. 21, 2022

Related U.S. Application Data

(63) Continuation-in-part of application No. 17/151,137, filed on Jan. 16, 2021, now abandoned, which is a
(Continued)

(51) Int. Cl.
*B60J 5/04* (2006.01)
*B60K 35/10* (2024.01)
(Continued)

(52) U.S. Cl.
CPC ........... *B60J 5/0493* (2013.01); *B60J 5/0416* (2013.01); *B60K 35/10* (2024.01); *B60N 2/0228* (2013.01);
(Continued)

(58) Field of Classification Search
CPC ....... B60J 5/0493; B60J 5/0416; B60K 37/06; B60K 2370/34; B60K 2370/345;
(Continued)

(56) References Cited

U.S. PATENT DOCUMENTS 9,254,765 B2 2/2016 Laird et al.
9,764,696 B2 9/2017 Miyashita et al.
(Continued)

FOREIGN PATENT DOCUMENTS

DE 102015212671 A1 * 1/2017
JP 2019142310 A 8/2019
(Continued)

OTHER PUBLICATIONS

DE-102015212671-A1 computer translation (Year: 2017).*
(Continued)

*Primary Examiner* — Amy R Weisberg
*Assistant Examiner* — Melissa Ann Bonifazi
(74) *Attorney, Agent, or Firm* — CANTOR COLBURN LLP (57) ABSTRACT

A vehicle door trim interior, including: an armrest; a surface depression located in the armrest, wherein the surface depression is covered with a skin; at least one actuation switch located below the skin and in the surface depression; and a position control switch associated with least one actuation switch, the position control switch only becoming active upon actuation of the at least one actuation switch.

20 Claims, 6 Drawing Sheets

Related U.S. Application Data continuation of application No. PCT/US2019/041812, filed on Jul. 15, 2019.

(60) Provisional application No. 63/092,898, filed on Oct. 16, 2020, provisional application No. 62/698,620, filed on Jul. 16, 2018.

(51) Int. Cl.
  *B60K 37/06* (2006.01)
  *B60N 2/02* (2006.01)
  *B60N 2/75* (2018.01)
  *B60Q 3/233* (2017.01)
  *B60R 13/02* (2006.01)

(52) U.S. Cl.
  CPC ............... *B60N 2/78* (2018.02); *B60Q 3/233* (2017.02); *B60R 13/0243* (2013.01); *B60K 2360/143* (2024.01); *B60K 2360/34* (2024.01); *B60K 2360/345* (2024.01); *B60R 2013/0287* (2013.01)

(58) Field of Classification Search
  CPC ...... B60K 2370/141; B60K 2370/1434; B60K 2370/794; B60K 35/00; B60N 2/0228; B60N 2/78; B60N 2/797; B60Q 3/233; B60R 13/0243; B60R 2013/0287
  See application file for complete search history.

(56) References Cited

U.S. PATENT DOCUMENTS

| | | | |
|---|---|---|---|
| 2015/0279523 A1 | 10/2015 | Oeuvrard et al. | |
| 2018/0147982 A1 | 3/2018 | Veca et al. | |
| 2020/0189434 A1 | 6/2020 | Xu et al. | |
| 2021/0129770 A1 | 5/2021 | Bame et al. | |

FOREIGN PATENT DOCUMENTS

| | | | | |
|---|---|---|---|---|
| KR | 100930700 B1 | 12/2009 | | |
| RU | 2578300 C1 | 3/2016 | | |
| RU | 2648929 C2 | 3/2018 | | |
| WO | WO-9711473 A1 | * | 3/1997 | ............ B60N 2/797 |
| WO | 2002008003 A1 | 1/2002 | | |
| WO | 2020018426 A1 | 1/2020 | | |

OTHER PUBLICATIONS

IPRP Mailed Apr. 27, 2023.
Non-Final Office Action dated Feb. 17, 2023.
International Preliminary Report on Patentability for International Application No. PCT/US2019/041812; Application Filing Date: Jul. 15, 2019; Date of Mailing: Jan. 19, 2021; 4 pages.
International Search Report for International Application No. PCT/US2019/041812; Application Filing Date: Jul. 15, 2019; Date of Mailing: Oct. 31, 2019; 3 pages.
Written Opinion for International Application No. PCT/US2019/041812; Application Filng Date: Jul. 15, 2019; Date of Mailing: Oct. 31, 2019; 4 pages.
International Search Report for International Application No. PCT/US2021/055400; Application Filing Date: Oct. 18, 2021; Date of Mailing: Feb. 4, 2022; 3 pages.
Written Opinion for International Application No. PCT/US2021/055400; Application Filng Date: Oct. 18, 2021; Date of Mailing: Feb. 4, 2022; 5 pages.

* cited by examiner

AUTOMOTIVE TRIM PIECE WITH INTUITIVE SMART SWITCHES LOCATED UNDER THE AUTOMOTIVE SOFT TRIM SKIN

CROSS REFERENCE TO RELATED APPLICATIONS

This application claims priority to U.S. Provisional Patent Application No. 63/092,898 filed on Oct. 16, 2020, the contents of which are incorporated herein by reference thereto.

This application is also a Continuation-in-Part Application of U.S. patent application Ser. No. 17/151,137 filed on Jan. 16, 2021, which is a Continuation of PCT Application No. PCT/US2019/041812 filed on Jul. 15, 2019, which claims the benefit of U.S. Provisional Patent Application No. 62/698,620 filed on Jul. 16, 2018, the entire contents each of which are incorporated herein by reference thereto.

BACKGROUND

Exemplary embodiments of the present disclosure pertain to the art of interior automotive trim pieces in combination with at least one switch operably coupled to an actuatable device of the vehicle.

Traditional vehicles have physical toggle switches in the door trim for locking/unlocking the doors and/or rolling the windows up/down. These systems can be complex and are often limited in design freedom by size and packaging space.

An automotive window regulator controls the location of a window of the vehicle by indirectly controlling the motion of the glass. For example, rocker style mechanical switches direct power to a window lift motor to run it in a clockwise or counterclockwise direction, thus causing the window regulator to move the window glass in the up or down direction. In one application, the glass continues to move until the switch is deactivated. An alternate feature is to engage the rocker switch into a position that initiates auto up or down travel, thus driving the motor until the window regulator stalls or soft stops into a full up or full down position.

These systems requires full attention to the motion of the glass throughout its travel if the operator wants to stop the glass at any location other than full up or down. In addition, these systems may allow the operator to inadvertently engage auto mode when manual mode was desired.

Accordingly, it is desirable to provide an improvement to the physical toggle switches located on a surface of the interior trim of the vehicle.

BRIEF DESCRIPTION

Disclosed is a vehicle door trim interior, including: an armrest; a surface depression located in the armrest, wherein the surface depression is covered with a skin; at least one actuation switch located below the skin and in the surface depression; and a position control switch associated with least one actuation switch, the position control switch only becoming active upon actuation of the at least one actuation switch.

In addition to one or more of the features described above, or as an alternative to any of the foregoing embodiments, the position control switch controls a window regulator that moves a window of a vehicle door according a position selected by touching the position control switch.

In addition to one or more of the features described above, or as an alternative to any of the foregoing embodiments, the least one actuation switch and the position control switch are located below portions of the skin that has an associated symbol located thereon.

In addition to one or more of the features described above, or as an alternative to any of the foregoing embodiments, the associated symbol is etched or perforated in the skin.

In addition to one or more of the features described above, or as an alternative to any of the foregoing embodiments, the associated symbol is etched or perforated in the skin.

In addition to one or more of the features described above, or as an alternative to any of the foregoing embodiments, the least one actuation switch and the position control switch are backlit.

In addition to one or more of the features described above, or as an alternative to any of the foregoing embodiments, the surface depression of the armrest is located in a forward area of the armrest.

In addition to one or more of the features described above, or as an alternative to any of the foregoing embodiments, the at least one actuation switch is not visually perceivable through the skin.

Also disclosed is a vehicle door trim interior, including: an armrest; a surface depression located in the armrest, wherein the surface depression is covered with a skin; and at least one touch sensor operably coupled to an actuator of a component of the vehicle door trim interior, wherein the at least one touch sensor is not visually perceivable through the skin.

In addition to one or more of the features described above, or as an alternative to any of the foregoing embodiments, the at least one touch sensor is located below a portion of the skin that has a symbol located thereon.

In addition to one or more of the features described above, or as an alternative to any of the foregoing embodiments, the symbol is etched or perforated in the skin.

In addition to one or more of the features described above, or as an alternative to any of the foregoing embodiments, the symbol is stitched or embroidered in the skin.

In addition to one or more of the features described above, or as an alternative to any of the foregoing embodiments, the at least one touch sensor is backlit.

In addition to one or more of the features described above, or as an alternative to any of the foregoing embodiments, the surface depression of the armrest is located in a forward area of the armrest.

In addition to one or more of the features described above, or as an alternative to any of the foregoing embodiments, the component is a window.

In addition to one or more of the features described above, or as an alternative to any of the foregoing embodiments, the at least one touch sensor is a plurality of touch sensors.

Also disclosed is a vehicle trim interior, including: a surface depression located in the vehicle trim interior, wherein the surface depression is covered with a skin; and at least one touch sensor operably coupled to an actuator of a component of the vehicle door trim interior, wherein the at least one touch sensor is not visually perceivable through the skin.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
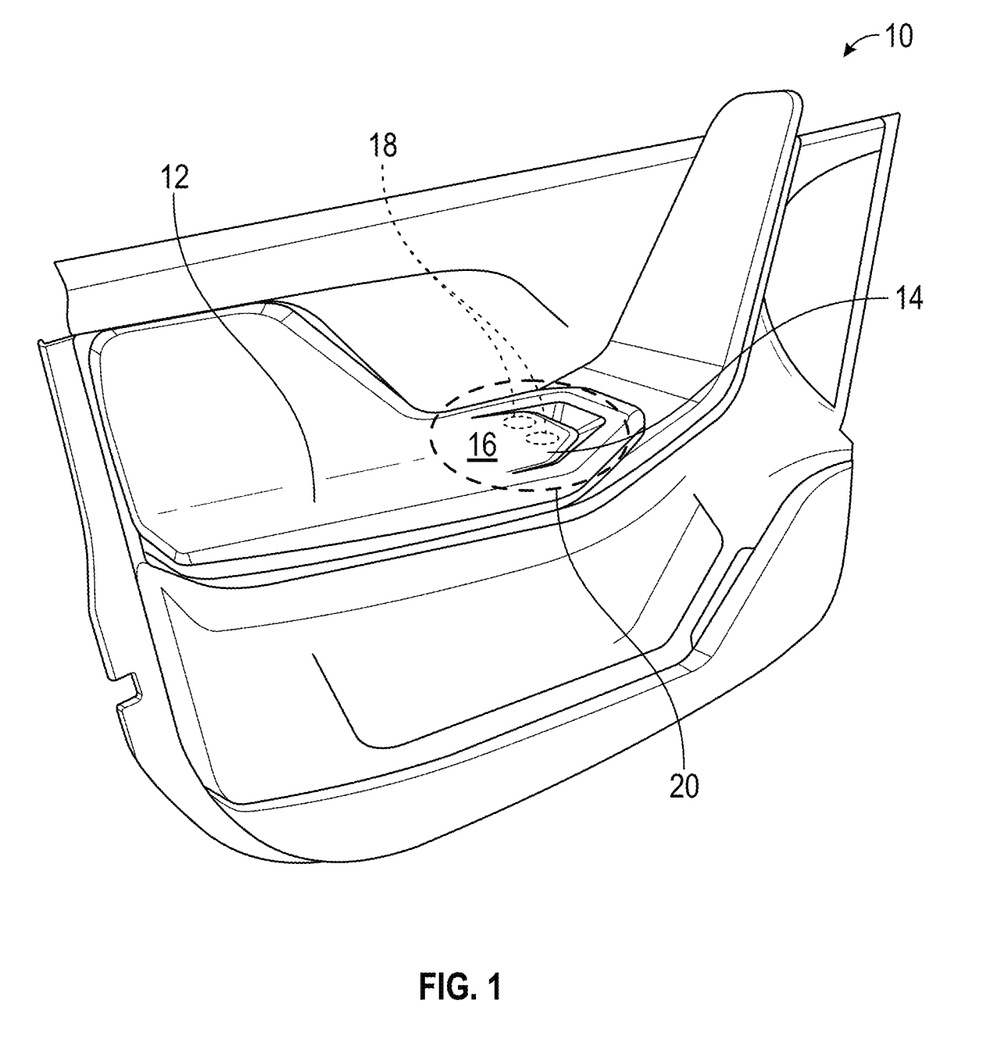
FIG. 1 is a perspective view of a vehicle door trim interior having an armrest.

FIG. 1 illustrates a perspective view of a vehicle door trim interior 10 having an armrest 12. The armrest 12 has a small surface depression 14 about the width of three fingers in the armrest 12. Of course, other sizes (e.g., width and length) greater or less than the aforementioned width are considered to be within the scope of various embodiments of the present disclosure. The small surface depression is covered with an interior trim or show surface or skin 16 that is soft to the touch like leather or similar material. As such, this skin 16 is the final or class A surface of the vehicle interior. In other, words this material is the outer surface of the interior trim. For example and in one embodiment, the skin 16 extends over other portions of the trim including but not limited to the depression 14. One non-limiting example of such a material is a thermoplastic olefin (TPO). Underneath this layer of skin is a plurality of touch sensors 18 in various locations for activating numerous components of the vehicle for example, operation of the windows (up/down) and the vehicle latch to lock/unlock the doors. In other words, the sensors 18 are operably coupled to an actuator 22 of the components such that the sensors when activated operate as a switch 18 to operate the actuator of the components.

In one embodiment, the touch sensors 18 are located under the interior trim or show surface or skin 16 so that they are not visually perceivable. Each of these touch sensors 18 may be located underneath touch zones that are indicated by symbols that in one embodiment may be etched or perforated in the skin 18 for visual reference. In another embodiment, the symbols may be stitched or embroidered in the skin. In another embodiment, the touch sensors 18 may be backlit or illuminated to provide a means for locating the touch sensors. In another embodiment, the areas of the interior trim or show surface or skin 16 is provided with a tactile means (e.g., bump or protrusion) for locating the touch sensors 18.

In one embodiment, the touch sensors may be a capacitive switch that is actuated (e.g., closed) when the user's hand is in close proximity to the switch 18.

In one embodiment, the small surface depression 14 of the armrest 12 may be referred to a smart surface interface 20. In one embodiment, the smart surface interface 20 may be located in the forward area of the door trim armrest 12 as illustrated in FIG. 1, for comfort and ergonomics.

Figure 2:
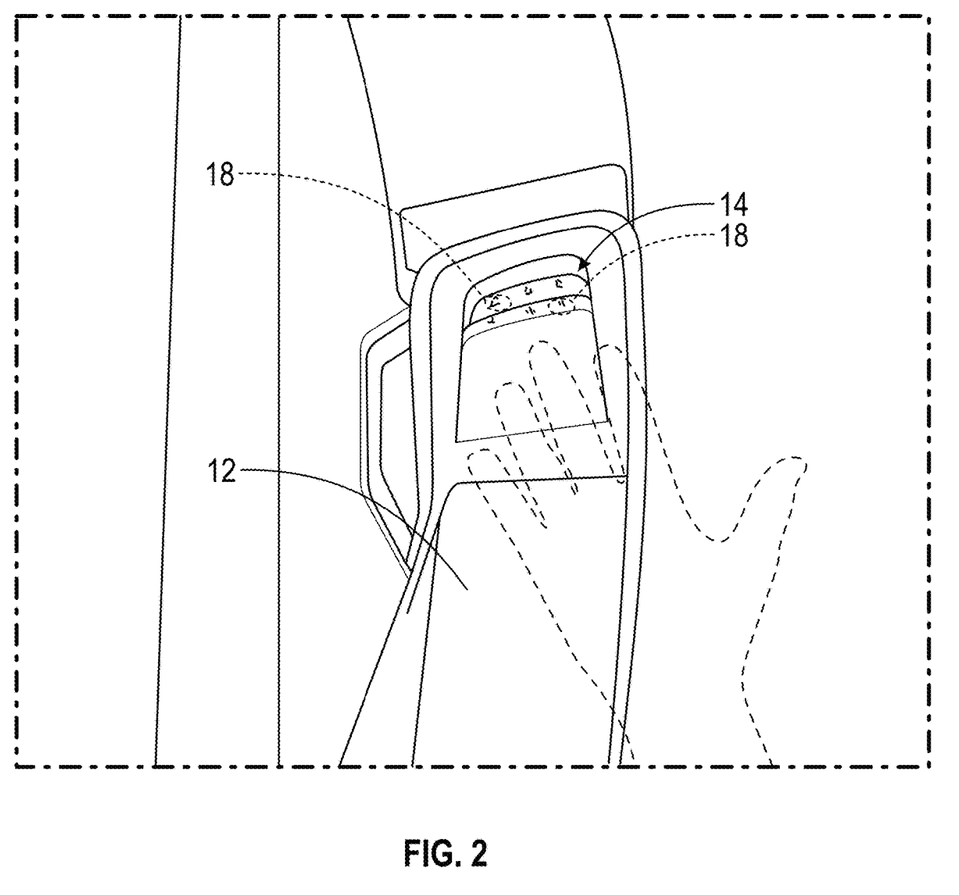
FIG. 2 is an enlarged view of an area of the vehicle door trim of FIG. 1 illustrating an area for a switch in accordance an embodiment of the present disclosure.

In one embodiment and as illustrated in at least FIG. 2, the indented surface 14 with the touch sensors 18 is for operating window down functions for driver/passenger side windows. Of course, other numerous vehicle functions may be operated by the aforementioned switches. As mentioned above, the switches would be located underneath the indented surface 14 in order to avoid inadvertent actuation.

Figure 3:
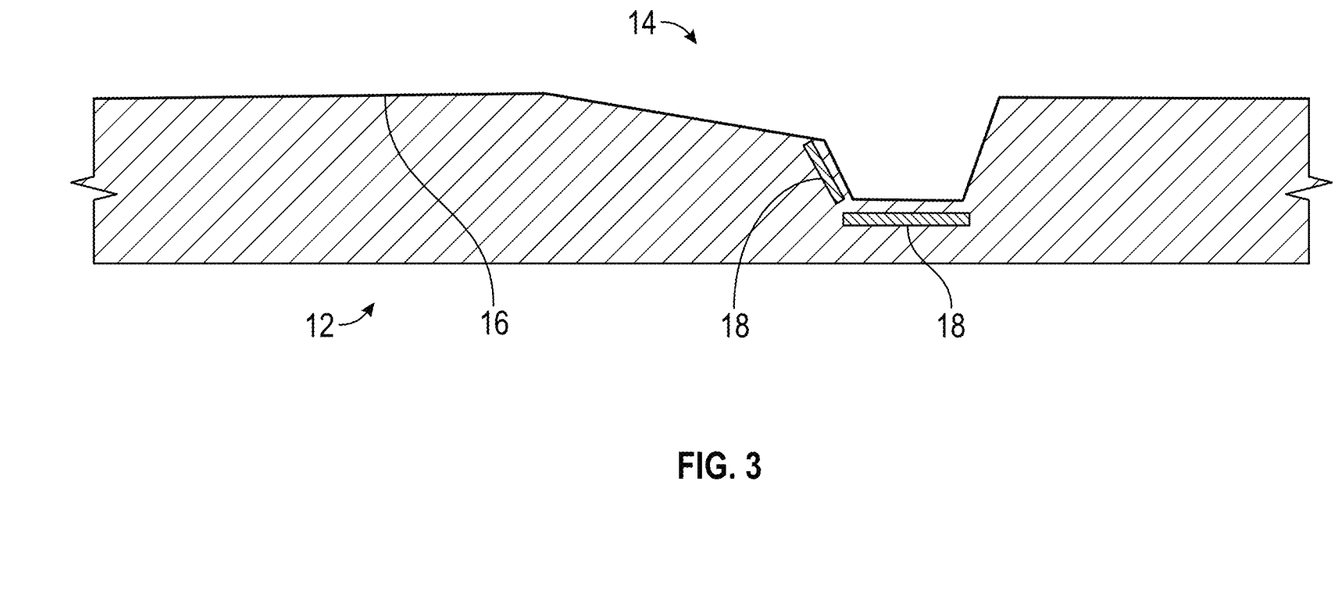
FIG. 3 is a partial cross-sectional view of a switch in accordance with an embodiment of the present disclosure.
Figure 4:
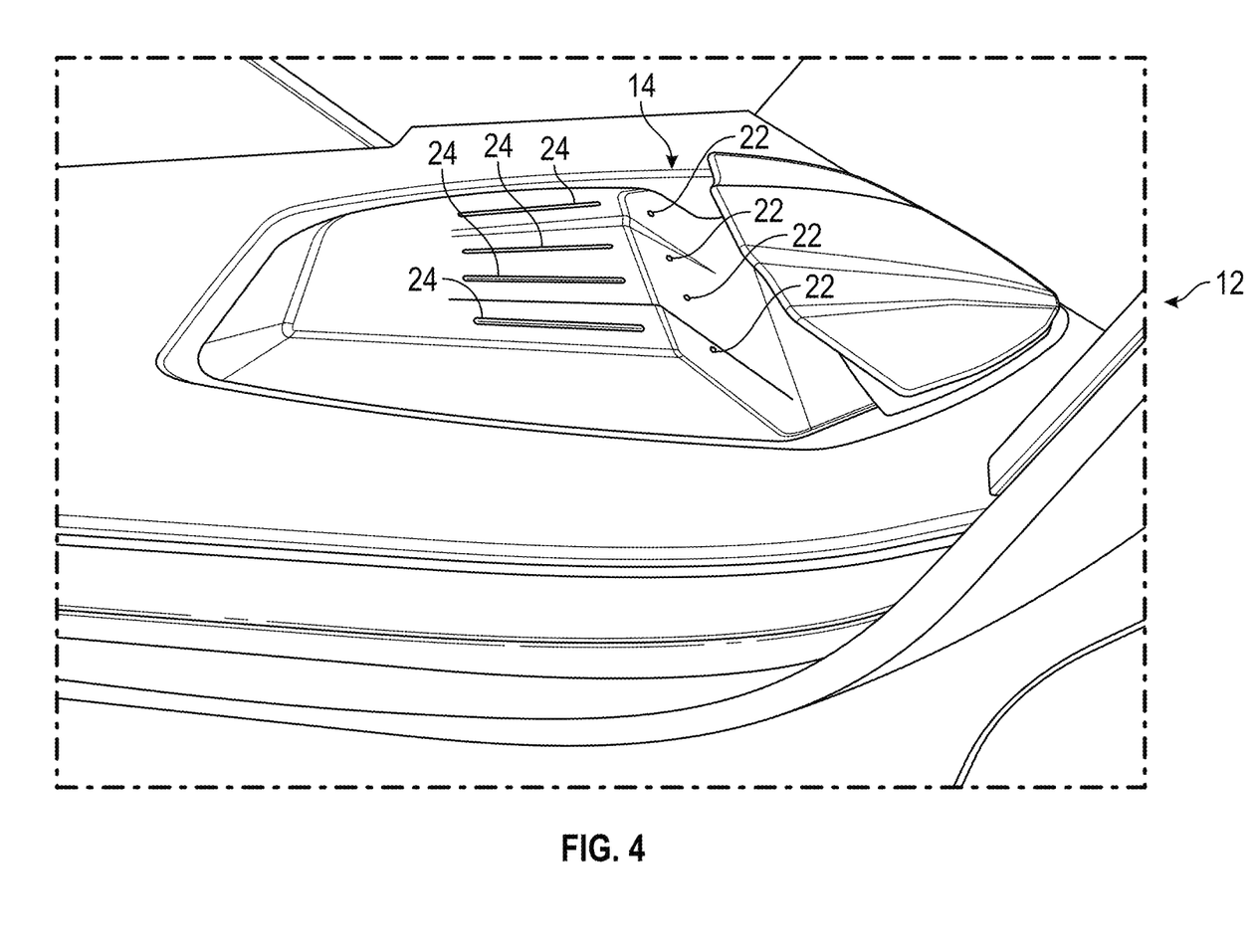
FIG. 4 is a perspective view of a vehicle door trim interior having switches for window regulators in accordance with an embodiment of the present disclosure.
Figure 5:
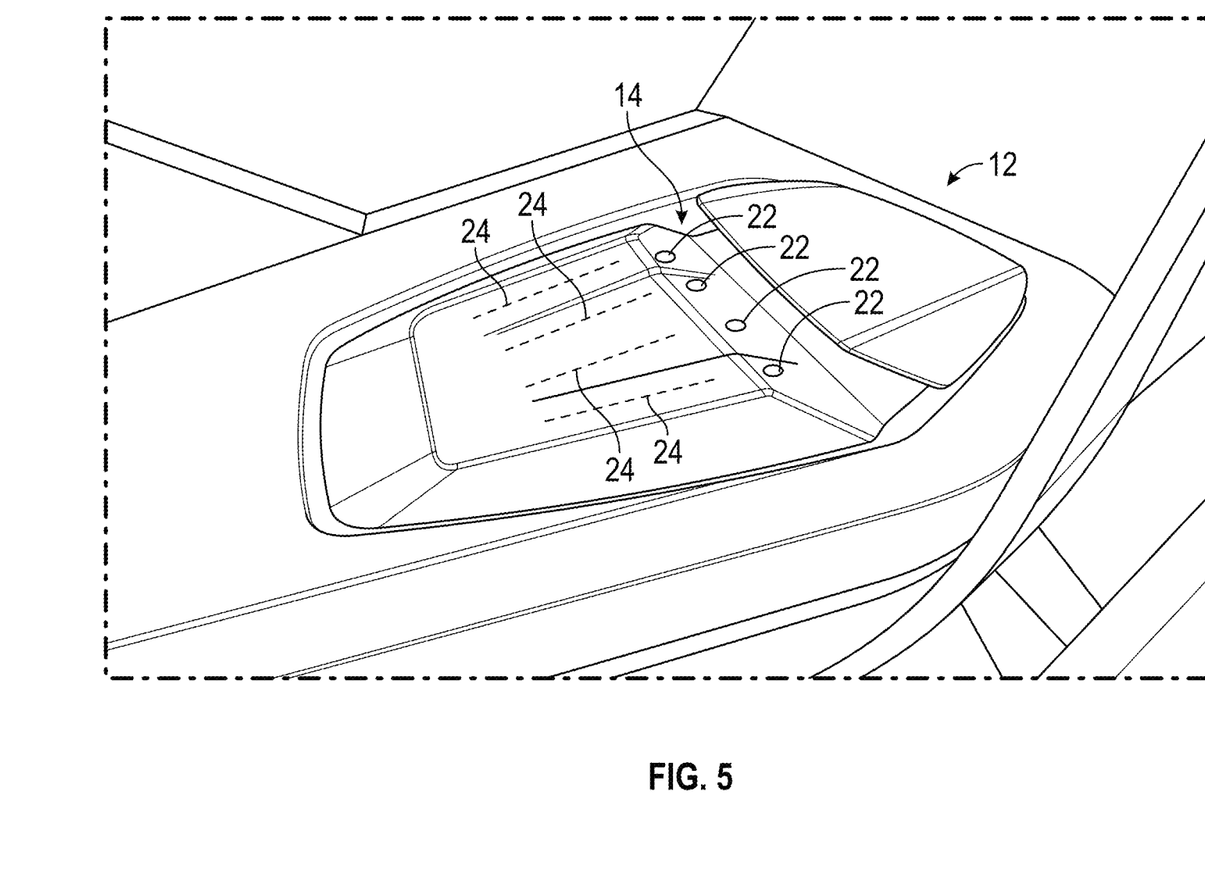
FIG. 5 is a perspective view of a vehicle door trim interior having switches for window regulators in accordance with an embodiment of the present disclosure.

FIG. 3 is a partial cross-sectional view of a portion of the indented surface 14 in accordance with an embodiment of the present disclosure.

Although, the present disclosure illustrates the indented surface or depression 14 as being associated with an arm rest 12. This indented surface or depression 14 and its associated sensors 18 may be located in numerous other locations in the vehicle interior. Non-limiting locations include the center console, door trim panels, instrument panels or any other trim surface of the vehicle interior.

Referring now to FIGS. 4-7, a portion of an arm rest 12 according to another embodiment is illustrated. In this embodiment, a system is provided that allows an operator to choose a desired final location of a window of a vehicle such that the system understands on its own how to drive itself to the new location. Thus, this system provides window location control, not window motion control, which is ultimately what the operator wants.

Here the touch sensors 18 include a first switch or actuation switch 22 and a second switch or a position control switch 24 for each of the windows of the vehicle. For example, four such combinations (e.g., first switch 22 and second position control switch 24) are illustrated. Again, the first switches 22 and the second position control switches 24 are located below the surface of the arm rest 12.

The position control switch 24 is a slide style switch, which could be mechanical or capacitive. In one embodiment, a capacitive slide is being used for the position control switch 24. In one embodiment, the position control switch 24 is only active for a short period of time after it is activated by actuating a corresponding first switch 22, which when actuated activates its corresponding position control switch 24. In other words, the position control switch 24 is only active or operative when its corresponding first switch 22 has been actuated.

When the position control switch 24 is active, the operator simply selects any position on the slide (e.g., position control switch 24) between full down and full up as the desired position for the window. For example, the portion of the line representing the position control switch 24 closest to its associated first or actuation switch 22 may be referred to the full up position and the portion of the line representing the position control switch 24 furthest from its associated first or actuation switch 22 is the full down position.

During operation, the user contacts the first or actuation switch 22 which then actives the position control switch 24. Once activated the user simply touches any portion of the position control switch 24 and the window will be driven to that location. This occurs due to a command signal of the position control switch 24 being sent to an associated window regulator when the position control switch 24 is actuated.

As such, the window regulator then moves the window to a new location based upon the area of the position control switch 24 touched by the user.

Accordingly, a switch pod or smart window switch can perform the functions described above namely position control of the window. In order to operate a window regulator associated with the first or actuation switch 22 and it associated position control switch 24.

Once the first or actuation switch 22 is activated its associated position control switch 24 is activated. The selected position control switch 24 allows a user to select a desired location of the window. The location control may be fully analog or a digital selection of enough positions to give the appearance of being analog. In one non-limiting embodiment, each position control switch has 19 positions (full up, full down, and 17 positions in between). Of course it is contemplated, the number of positions in between may be greater or less than 17.

The capacitive touch window switches (e.g., first or actuation switch 22 is activated it associated position control switch 24) located under leather covering provide unique window travel control.

Figure 6:
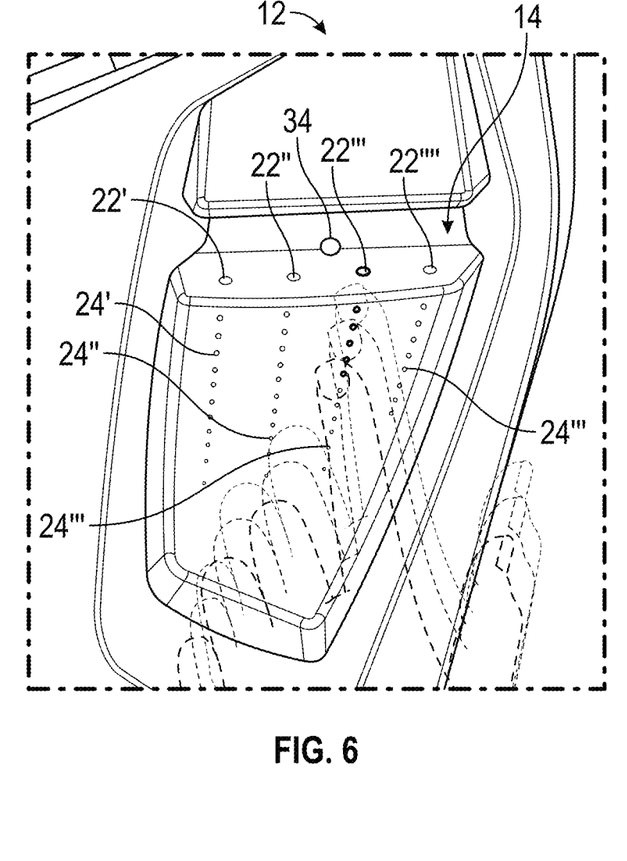
FIG. 6 is a view of a vehicle door trim interior having switches for a window regulators in accordance with an embodiment of the present disclosure.
Figure 7:
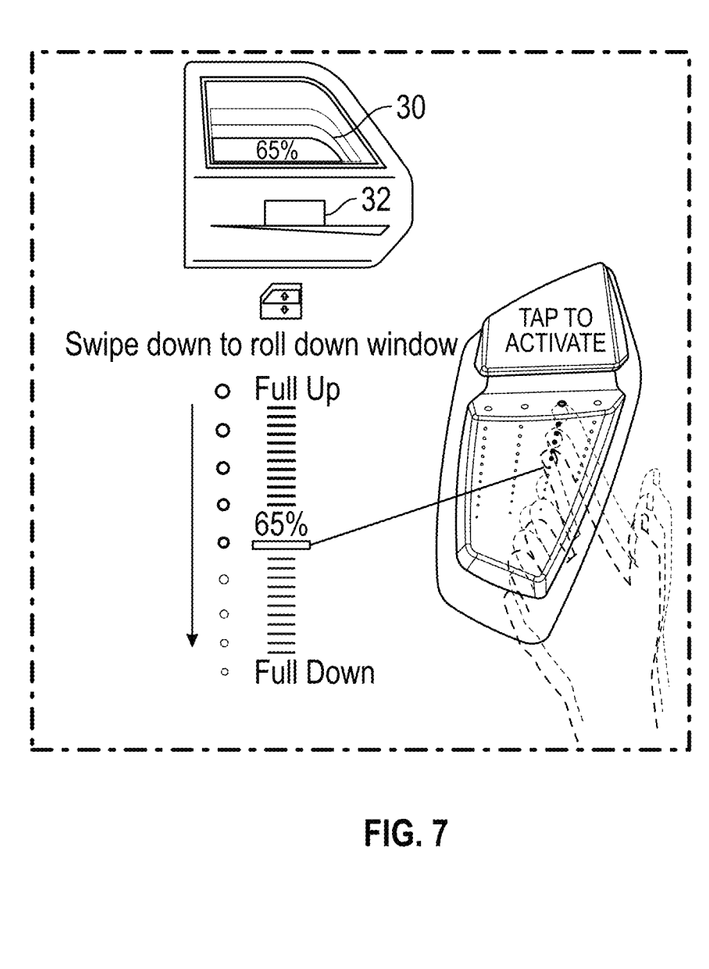
FIG. 7 illustrates operation of the switches for window regulators in accordance with an embodiment of the present disclosure.

FIGS. 6 and 7 illustrate operation of the capacitive switches located below the leather or interior trim surface material of the arm rest 12. Here the first or actuation switch 22 and its associated position control switch 24 are referenced by pairs (22' and 24'; 22" and 24"; 22'" and 24'"; and 22"" and 24"").

In FIG. 7 the position of a window 30 is illustrated where the user has first activated an actuation switch 22 and then its associated position control switch 24 touching a point corresponding to a 65% open position of the window, which then causes the window to move to the 65% open position through operation of a window regulator (illustrated schematically by box 32) operably coupled to the window 30 and the switches 22 and 24 of the arm rest 12.

As illustrated in FIGS. 4-7, the actuation switches 22 are located in the depression 14 so that inadvertent actuation of the actuation switches 22 does not occur. Once the actuation switches 22 are activated then the associated position control switch 24 can be actuated in order to operate the window regulator 32 so that the window 30 moves to the desired location through operation of the position control switch 24. As such, the windows of the vehicle can then be told to travel to any position—full up, full down, or anywhere in between with a single touch or slide of the finger of an operator.

Although operation of only one window is described, embodiments of the present disclosure contemplates an "all open" command or "all close" command, or "all vent" command. In the this embodiment, an additional "all open", "all close", "all vent" actuation switch 34 or switches 34 may be provided. See at least FIG. 6 where only one additional actuation switch 34 is illustrated. It is understood, that these switches 34 may be in any location not necessarily the location illustrated in FIG. 6. One non-limiting preferred location would be within indented surface 14 in order to avoid inadvertent actuation of the switches.

In this embodiment, the actuation of switch 34 may operate all of the window regulators of the windows of the vehicle by providing the required commands. Operation may be simply actuation of switch 34 or actuation of an associated switch 34 where one switch provides an "all open", "all close" and "all vent" command to the all of the window regulators of the windows of the vehicle. In one implementation, a first switch 34 is provided for the "all open" command and a second switch 34 (not shown) is provided for the "all close" command and a third switch 34 (not shown) is provided for the "all vent" command.

Alternatively, actuation of switch 34 first provides an "all open" command to all of the window regulators of the vehicle and a subsequent actuation of the same switch would provide an "all close" command to all the window regulators of the vehicle and yet another separate switch 34 (not shown) provide the "all vent" command to all of the window regulators of the vehicle.

In yet another embodiment, an "all window" command may be provided to the associated window regulators of the vehicle by simultaneously actuating all actuation switches 22 and then touching one or all of the position control switches 24 to provide the "all open", "all close" and "all vent" command to the all of the window regulators of the windows of the vehicle. In this embodiment, there may be no need for switch or switches 34.

In one implementation the associated electronics of the window regulators will account for possible concurrent stalls during movement of the associated windows and adjust power appropriately to an operating motor of a window regulator in order to ensure a good seal force is attained.

It being understood that the embodiments of FIGS. 4-7 may include all of the features described with respect to FIGS. 1-3.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle door trim interior, comprising:
   an armrest;
   a surface depression located in the armrest, the surface depression being recessed with respect to an area of the armrest partially surrounding the surface depression wherein the area of the armrest partially surrounding the surface depression and the surface depression are covered with a skin such that a portion of the skin covering the surface depression is recessed with respect to another portion of the skin covering the area of the armrest partially surrounding the surface depression;
   at least one actuation switch located below the skin and in the surface depression; and a position control switch associated with least one actuation switch, the position control switch only becoming active upon actuation of the at least one actuation switch.

2. The vehicle door trim interior as in claim 1, wherein the position control switch controls a window regulator that moves a window of a vehicle door according a position selected by touching the position control switch.

3. The vehicle door trim interior as in claim 1, wherein the least one actuation switch and the position control switch are located below portions of the skin that has an associated symbol located thereon.

4. The vehicle door trim interior as in claim 3, wherein the associated symbol is etched or perforated in the skin.

5. The vehicle door trim interior as in claim 3, wherein the associated symbol is etched or perforated in the skin.

6. The vehicle door trim interior as in claim 1, wherein the least one actuation switch and the position control switch are backlit.

7. The vehicle door trim interior as in claim 1, wherein the surface depression of the armrest is located in a forward area of the armrest.

8. The vehicle door trim interior as in claim 1, wherein the at least one actuation switch is not visually perceivable through the skin.

9. A vehicle door trim interior, comprising:
    an armrest;
    a surface depression located in the armrest, the surface depression being recessed with respect to an area of the armrest partially surrounding the surface depression wherein the area of the armrest partially surrounding the surface depression and the surface depression are covered with a skin such that a portion of the skin covering the surface depression is recessed with respect to another portion of the skin covering the area of the armrest partially surrounding the surface depression; and
    at least one touch sensor operably coupled to an actuator of a component of the vehicle door trim interior, wherein the at least one touch sensor is not visually perceivable through the skin.

10. The vehicle door trim interior as in claim 9, wherein the at least one touch sensor is located below a portion of the skin that has a symbol located thereon.

11. The vehicle door trim interior as in claim 10, wherein the symbol is etched or perforated in the skin.

12. The vehicle door trim interior as in claim 10, wherein the symbol is stitched or embroidered in the skin.

13. The vehicle door trim interior as in claim 9, wherein the at least one touch sensor is backlit.

14. The vehicle door trim interior as in claim 9, wherein the surface depression of the armrest is located in a forward area of the armrest.

15. The vehicle door trim interior as in claim 9, wherein the component is a window.

16. The vehicle door trim interior as in claim 9, wherein the at least one touch sensor is a plurality of touch sensors.

17. A vehicle trim interior, comprising:
    a surface depression located in the vehicle trim interior, the surface depression being recessed with respect to an area of the vehicle trim interior partially surrounding the surface depression wherein the area of the vehicle trim interior partially surrounding the surface depression and the surface depression are covered with a skin such that a portion of the skin covering the surface depression is recessed with respect to another portion of the skin covering the area of the vehicle trim interior partially surrounding the surface depression; and
    at least one touch sensor operably coupled to an actuator of a component of the vehicle door trim interior, wherein the at least one touch sensor is not visually perceivable through the skin.

18. The vehicle trim interior as in claim 17, wherein the surface depression is defined by a pair of opposing sidewalls that are spaced from each other, the pair of opposing sidewalls define a pair of openings that provide access to the surface depression.

19. The vehicle door trim interior as in claim 1, wherein the surface depression extends in a first direction and wherein at least two actuation switches are located below the skin in the surface depression and the at least two actuation switches are aligned in the first direction.

20. The vehicle door trim interior as in claim 9, wherein the surface depression has a width that extends between openings in sidewalls of the armrest.

* * * * *